United States Patent [19]
Poretsky

[11] Patent Number: 6,141,322
[45] Date of Patent: Oct. 31, 2000

[54] METHOD AND APPARATUS FOR PRECEDENCE AND PREEMPTION IN ATM CONNECTION ADMISSION CONTROL

[75] Inventor: Scott Michael Poretsky, Northbore, Mass.

[73] Assignee: General DataComm, Inc., Middlebury, Conn.

[21] Appl. No.: 08/853,654

[22] Filed: May 9, 1997

[51] Int. Cl.[7] .................................................... H04L 12/56
[52] U.S. Cl. ......................... 370/231; 370/252; 370/398; 370/433
[58] Field of Search .................................... 370/229, 230, 370/231, 235, 238, 252, 395, 397, 398, 399, 453, 455, 457, 468, 433; 379/208, 209; 340/825.44, 826.5, 825.51

[56] References Cited

U.S. PATENT DOCUMENTS

| | | | |
|---|---|---|---|
| 4,959,648 | 9/1990 | Breeden et al. | 340/825.44 |
| 5,062,106 | 10/1991 | Yamazaki et al. | 370/397 |
| 5,267,232 | 11/1993 | Katsube et al. | 370/230 |
| 5,321,692 | 6/1994 | Wallmeier | 370/339 |
| 5,335,222 | 8/1994 | Kamoi et al. | 370/230 |
| 5,357,507 | 10/1994 | Hughes et al. | 370/234 |
| 5,390,184 | 2/1995 | Morris | 370/353 |
| 5,446,730 | 8/1995 | Lee et al. | 370/351 |
| 5,490,141 | 2/1996 | Lai et al. | 370/352 |
| 5,557,611 | 9/1996 | Cappellari et al. | 370/395 |
| 5,594,717 | 1/1997 | Watanabe et al. | 370/232 |
| 5,666,364 | 9/1997 | Pierce et al. | 370/455 |
| 5,708,660 | 1/1998 | Riedel | 370/397 |
| 5,761,274 | 6/1998 | Uehara et al. | 379/67.1 |
| 5,850,385 | 12/1998 | Esaki | 370/216 |

OTHER PUBLICATIONS

Bolla, R. Danovaro et al., "An integrated Dynamic Resource Allocation Scheme for ATM Networks", IEEE Infocom, pp 1288–1297 (1993).

Chao, J. and Uzun, N., "An ATM Queue Manager with Multiple Delays and Loss Priorities", IEEE Globecom, pp. 308–313 (1992).

Dailianias, A. and Bovopoulos, A., "Design of a Real–Time Call Admission Control Algorithm with Priority Support", IEEE, pp. 819–826 (1995).

Dailanias, A. and Bovopoulos, A., "Real–Time Admission Control Algorithms with Delay and Loss Guarantees in ATM Networks", IEEE, pp. 1065–1072 (1994).

Elwalid, A. and Mitra, D., "Analysis, Approximations, and Admission Control of Multi–Service Multiplexing System with Priorities", IEEE, pp. 463–472 (1995).

Esaki, H., "Call Admission Control Method for ATM Networks", SuperComm/ICC, pp. 1628–1633 (1992).

(List continued on next page.)

Primary Examiner—Chi H. Pham
Assistant Examiner—Kwang B. Yao
Attorney, Agent, or Firm—David P. Gordon; David S. Jacobson; Thomas A. Gallagher

[57] ABSTRACT

A informational element (IE) is provided which permits the user to assign a precedence level to a call. A precedence/preemption connection admission control (P/P CAC) for use with any bandwidth allocation algorithm is also provided for processing a virtual circuit connection (VCC) request having an assigned precedence level, and for preempting one or more VCCs when a VCC request having a relatively higher precedence level is received at an ATM switch. Preferably, a resource allocator containing two databases, one listing all active virtual circuit connections and a second listing all preempted virtual circuits, is provided for storing the call parameters of preempted VCCs. According to a preferred embodiment, preempted VCCs may be reestablished. Reestablishment occurs according to various criteria. In addition, a second embodiment of a P/P CAC is provided in which active VCCs identified for preemption are buffered until the requested VCC is accepted by a downstream ATM switch. Once acceptance is received, the identified calls are released. If downstream acceptance is not provided prior to a timeout, the requested VCC is released and the VCCs identified for preemption are kept active.

18 Claims, 9 Drawing Sheets

OTHER PUBLICATIONS

Perros, H. and Elsayed, K., "Call Admission Control Schemes: A Review", IEEE Communications, pp. 82–91 (Nov. 1996).

Pitsillides, A. et al., "Dynamic Bandwidth Allocation of B–ISDN using Multi–Level Optimal Control", IEEE, pp. 1086–1094 (1995).

Saito, H. "Hybrid Connection Admission Control in ATM Networks", SuperComm/ICC, pp. 699–703 (1992).

Shacham, N., "Preemption–Based Admission Control in Multimedia Multiparty Communications", IEEE, pp. 827–834 (1995).

Tricci, S. and Vallee, R., "ATM Call Priority Feature for UNI and PNNI ATM Forum", Document No. 97–0443 (Apr. 27, 1997).

Saito, H., "Call Admission Control in an ATM Network Using Upper Bound on Cell Loss Probability," IEEE Transactions on Communications, vol. 40, pp. 1512–1521 (1992).

Sohraby, K., "Heavy Traffic Multiplexing Behavior of Highly Bursty Heterogenous Sources and Their Admission Control of High Speed Networks," Proceedings for INFOCOM, pp. 1518–1523 (1992).

| OCTETS | 8 | 7 | 6 | 5 | 4 | 3 | 2 | 1 |
|---|---|---|---|---|---|---|---|---|
| 1 | PROTOCOL DISCRIMINATOR ||||||||
| 2-5 | CALL REFERENCE ||||||||
| 6-7 | MESSAGE TYPE ||||||||
| 8-9 | MESSAGE LENGTH ||||||||
| 10+ | OPTIONAL INFORMATION ELEMENTS ||||||||

FIG. 1a
PRIOR ART

| OCTETS | 8 | 7 | 6 | 5 | 4 | 3 | 2 | 1 |
|---|---|---|---|---|---|---|---|---|
| 1 | INFORMATION ELEMENT (IE) IDENTIFIER ||||||||
| 2 | 1 | CODING STANDARD || IE INFORMATION FIELD |||||
| 3 | LENGTH OF INFORMATION FIELD ||||||||
| 4 | LENGTH OF INFORMATION FIELD (CONTINUED) ||||||||
| 5+ | CONTENTS OF INFORMATION FIELD ||||||||

CAC = CALL ADMISSION CONTROL
CSF = CELL SWITCH FABRIC
IM = INPUT MODULE
OM = OUTPUT MODULE

| FIG.7A | FIG.7B |

METHOD AND APPARATUS FOR PRECEDENCE AND PREEMPTION IN ATM CONNECTION ADMISSION CONTROL

BACKGROUND OF THE INVENTION

1. Field of the Invention

The present invention relates broadly to the field of telecommunications. More particularly, the present invention relates to the acceptance or rejection of a proposed connection through an asynchronous transfer mode (ATM) switch or node based on available bandwidth and the precedence assigned to the proposed connection.

2. State of the Art

Perhaps the most awaited, and now fastest growing technology in the field of telecommunications in the 1990's is known as Asynchronous Transfer Mode (ATM) technology. ATM is providing a mechanism for removing performance limitations of local area networks (LANs) and wide area networks (WANs) and providing data transfers at a speed of on the order of gigabits/second. The variable length packets of LAN and WAN data are being replaced with ATM cells which are relatively short, fixed length packets. Because ATM cells can carry voice, video and data across a single backbone network, the ATM technology provides a unitary mechanism for high speed end-to-end telecommunications traffic.

Because the data contained in the ATM cells can be generated from either generally fixed rate communications, or bursty type communications, it will be appreciated that traffic accommodation mechanisms have been introduced in order to avoid situations where ATM switches or nodes are over-taxed, resulting in loss of cells. In particular, buffering and leaky-bucket usage regulating mechanisms are well known. In addition, it is known in the art that ATM switches and nodes will first determine whether they have the capacity to handle a proposed call before accepting the call. This is achieved through connection admission control (CAC).

An important part of CAC is the signaling between the user and the network for call establishment. The user network interface (UNI) is the interface between the user and the network. There are five possible states for the UNI (null, call initiated, outgoing call proceeding, active, and release) and four signalling messages (SETUP, CALL PROCEEDING, CONNECT, and RELEASE requests). The CAC performs a network defined algorithm to determine whether the call request can be accepted while maintaining the guaranteed quality of service (QoS) of each currently existing connection. This is determined based upon the service class and traffic descriptors in information fields of the SETUP message. If a call request from the user is acceptable to the network, then a CALL PROCEEDING message is sent to the user. CONNECT messages are then exchanged and the connection becomes active for data cells to flow on the newly established connection from the user to the network. If the network cannot meet the QoS of the existing connections with the addition of the new connection, then the call request is rejected and a RELEASE message is returned to the user.

Figure 1A:
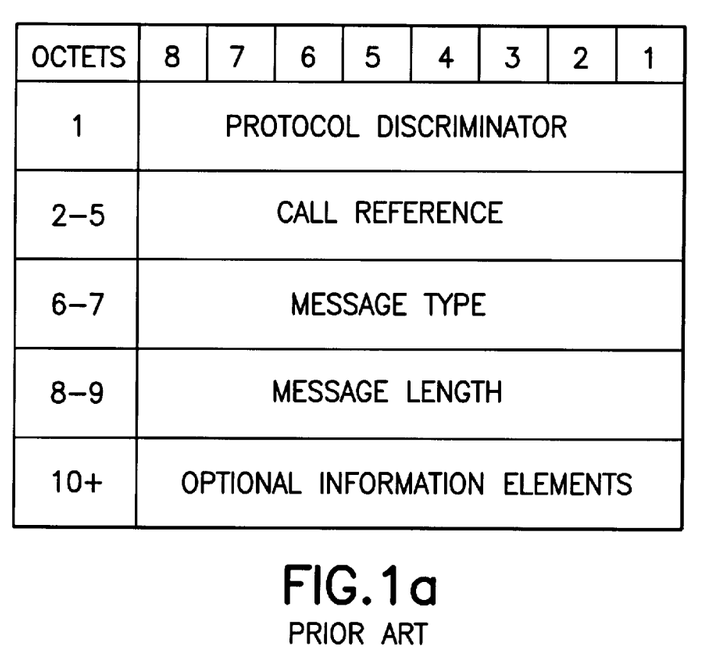
FIGS. 1(a) and 1(b) show the prior art Q.2931 signaling format of a message and information element, respectively.
Figure 1B:
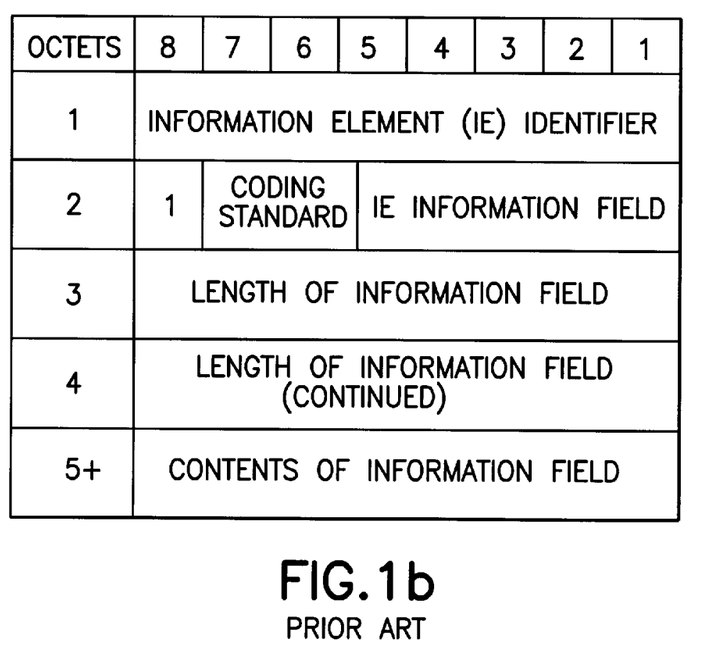

Referring to prior art FIG. 1(a), all of the call control signaling messages are provided in Q.2931 signaling format, with bytes 1 through 9 being standard, and bytes 10 and higher being message dependent information elements (IE). The signaling format for an IE is shown in FIG. 1(b). The SETUP message includes a number of IEs which are mandatory (user cell rate, called party number, connection identifier, QoS parameters, and broadband bearer capability), and may include optional IEs. Current optional IEs for the SETUP message include AAL parameter, calling party number, end point reference, broadband higher layer information, and broadband lower layer information. The bytes of the mandatory messages and optional IEs permit the CAC of an ATM switch to make an accept or reject decision.

Figure 2:
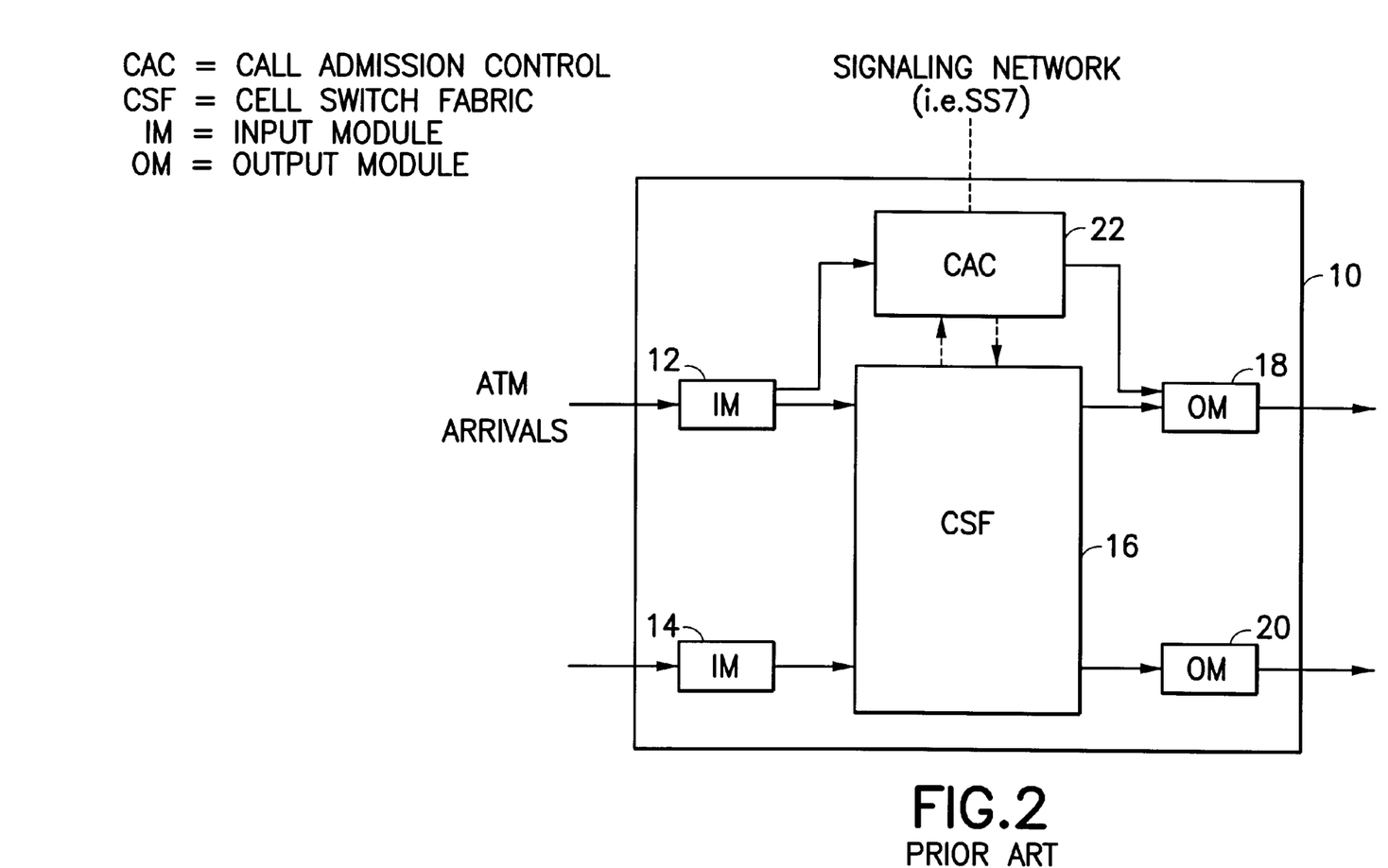
FIG. 2 is a functional block diagram of prior art ATM switch architecture.

Prior art FIG. 2 shows the architecture of an ATM switch 10. Input modules 12, 14 extract the ATM cell stream, perform usage parameter control, check for cell errors, and pass the acceptable cells to the switch fabric 16. The switch fabric 16 switches the cells from the input modules 12, 14 to the proper output modules 18, 20 based upon their VPI/VCI value. Signaling cells are identified by their VPI/VCI value and switched from the switch fabric 16 to the CAC 22 for processing. The output modules 18, 20 perform the opposite function of the input modules in order to prepare the switched cells into streams of cells for transmission.

Once a call is accepted, ATM requires that the QoS agreed to in the traffic contract between the source and network be guaranteed. To this end, ATM employs preventive and reactive traffic control methods through CAC, performed in a separate module in an ATM switch, and usage parameter control (UPC), performed within the input modules to prevent calls from being accepted if the QoS cannot be guaranteed. CAC generally performs the following functions: (1) negotiating new connection requests with a user and establishing a traffic contract characterizing source traffic and QoS, (2) deciding on admission or rejection of the new connection according to the network policy, (3) allocating network resources so that the network efficiency is maximized with the addition of a new connection, (4) providing acceptable values to the UPC, and (5) releasing network resources when a virtual circuit is disconnected.

Figure 3:
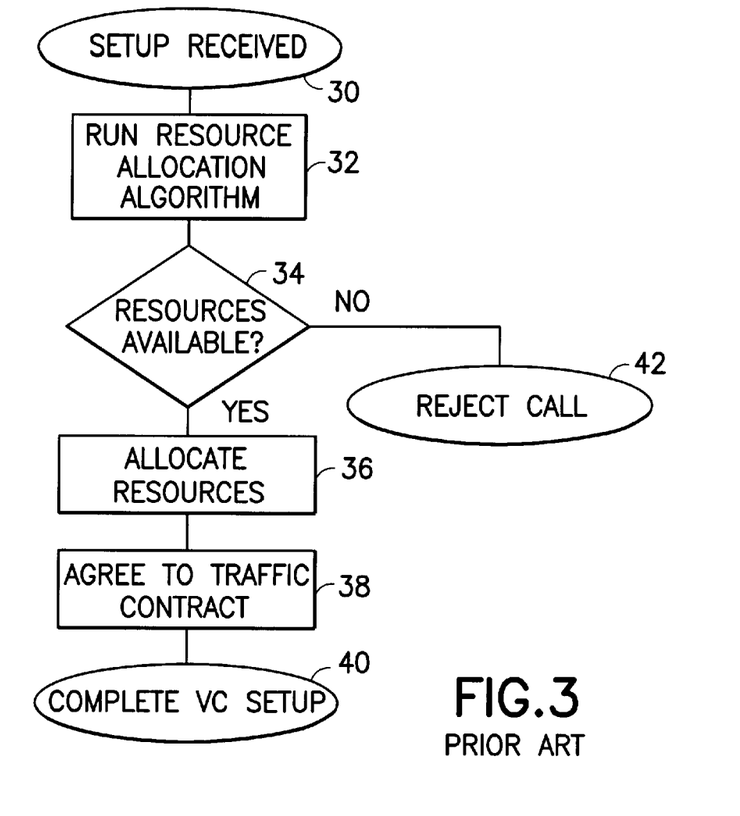
FIG. 3 is a typical connection admission control flow chart.

Referring to prior art FIG. 3, the CAC block receives a SETUP message at 30, and based upon the mandatory and optional IEs, reads the necessary resources for a requested virtual circuit connection (VCC) and runs a bandwidth allocation algorithm at 32 to determine at 34 whether the necessary resources are available at the switch. If the bandwidth allocation algorithm determines that the required resources are available, the CAC updates at 36 the allocation database with the new VCC and allocated resources, a traffic contract is agreed to at 38, and the VCC is passed at 40 to the user in a CONNECT message. If the algorithm determines that the required resources are not available, the CAC rejects the call at 42. The rejection is communicated through a RELEASE message. A number of different bandwidth allocation algorithms have been used for CAC, with the goal of each algorithm being to maximize the admission region and statistical gain of one or more particular types of ATM traffic over a switch without exceeding the bandwidth of the switch.

In addition, several algorithms have been proposed in which the ATM network assigns one of two precedence levels to cells traversing a VCC. For example, in 1992, Nippon Telephone and Telegraph proposed a buffer reservation scheme in which the cells of a call are assigned to one of two levels of precedence (Saito, H., "Hybrid Connection Admission Control in ATM Networks", SuperComm/ICC, 1992). A precedence would be assigned to a call using the cell loss priority (CLP) bit. The amount of buffer space reserved for high precedence cells is dynamically adjusted according to the required bandwidth of the high precedence cells. Low precedence cells would have available the remaining buffer space, in the dynamically allocated buffer. However, it is only once the network has determined that it can accept a requested VCC, that precedence is given to the high precedence cell stream.

Bellcore and Brooklyn Polytechnic Institute in 1992 proposed that service classes be treated as precedence levels and that a cell scheduling policy be implemented at the output buffer of the ATM switch to ensure that the traffic descriptor of the precedence levels are met (Chao, J. and Uzun, N., "An ATM Queue Manager with Multiple Delays and Loss Priorities", IEEE Globecom, 1992). Toshiba has proposed the same concept (see Esaki, H., "Call Admission Control Method for ATM Networks", SuperComm/ICC, 1992). However, while providing precedence for certain cells is helpful for guaranteeing QoS for certain service classes, these schemes do not guarantee that lower precedence calls will not cause a higher precedence user to fail to gain access to the network.

In 1995 AT&T Bell Labs proposed multiplexing output buffers and assigning each output buffer a precedence level (Elwalid, A. and Mitra, D., "Analysis, Approximations, and Admission Control of a Multi-Service Multiplexing System with Priorities", IEEE, 1995). Buffer access to the switch output would be determined by the precedence level of the buffer and the status of higher precedence buffers. This approach has several disadvantages. First, the buffer sizes are pre-allocated. Second, precedence is based solely upon cell traffic already on the network, as no consideration is made of the precedence levels of the cell traffic attempting to be connected to the network which may be higher than other cell traffic already on the network.

Columbia University and ChipCom have proposed dedicating service buffers coupled with dynamic precedence-based allocation within each buffer (Dailianas, A. and Bovopoulos, A., "Design of a Real-Time Call Admission Control Algorithm with Priority Support", IEEE, 1995). As in the Nippon proposal, two levels of precedence are indicated by the CLP bit. The network measures the occurrences of high precedence cells based on their CLP bit value and dynamically adjusts the amount of space dedicated to high precedence cells within each service buffer. However, like each of the other proposed schemes, precedence is only assigned to cells on accepted traffic, and is not assigned to VCCs. Preemption of a low precedence VCC for a higher precedence VCC is not provisioned.

SUMMARY OF THE INVENTION

It is therefore an object of the invention to provide a method and apparatus for permitting multiple precedence levels to be assigned to virtual circuit connections over an ATM switch.

It is another object of the invention to provide a method and apparatus for permitting precedence levels to be assigned by a user of the ATM network.

It is also an object of the invention to provide a method and apparatus for assigning more than two precedence levels to virtual circuit connections.

It is further object of the invention to provide a method and apparatus for preempting an existing virtual circuit having a certain precedence level in place of a call request having a user-assigned relatively higher precedence level.

It is yet another object of the invention to provide a method and apparatus for storing preempted calls in a database and automatically reestablishing the preempted calls in order of their precedence level as switch resources become available.

It is still a further object of the invention to provide a method and apparatus for buffering preempted calls slated to be preempted, and releasing preempted calls only when a complete virtual channel is established.

In accord with these objects which will be discussed in detail below, an new optional informational element (IE) is provided which permits the user to assign a precedence level to a VCC request. The IE is provided with a new IE identifier coding the IE for precedence levels. In a preferred embodiment, the network permits up to 256 user-assignable precedence levels to be assigned to a VCC, the precedence level of the VCC being coded by an octet of the contents of the IE.

In addition, a precedence/preemption connection admission control (P/P CAC) algorithm is provided for processing the precedence level assigned to a requested VCC and for preempting one or more VCCs when a requested VCC having a relatively higher precedence level is received at an ATM switch. The provided P/P CAC algorithm is compatible with all bandwidth allocation algorithms of the art. In implementing a preferred embodiment of the P/P CAC at a switch, a resource allocator containing two databases is provided, one listing the parameters of all active VCCs and a second listing the parameters of all preempted VCCs. According to a preferred embodiment, preempted VCCs may be reestablished according to different criteria.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 4:
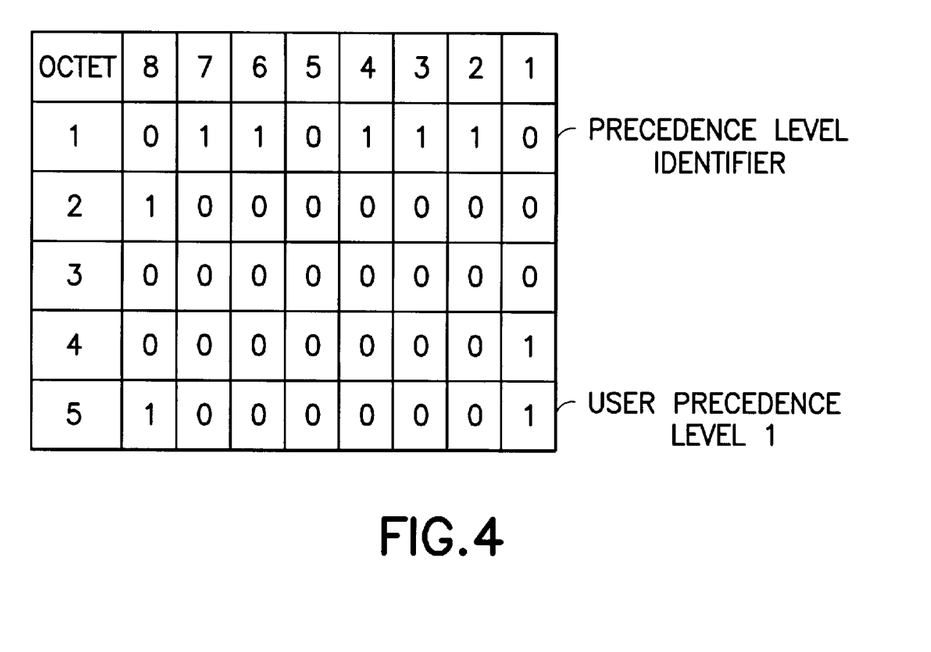
FIG. 4 is a exemplary information element for coding a precedence level.

Turning to FIG. 4, an informational element (IE) is shown in Q.2931 signalling format. The IE is provided for permitting a user to assign a precedence level to a call. The IE is provided with a particular IE identifier which codes the element as one containing a user assigned precedence level. In a preferred embodiment, one octet of the contents of the IE is provided for permitting the user to assign any of 256 precedence levels to a call. If a greater number of precedence levels are desired, more than one octet of contents may be used for precedence level assignment. Conversely, one or more bits of an octet may be used if the network requires fewer than 256 precedence levels.

Figure 5:
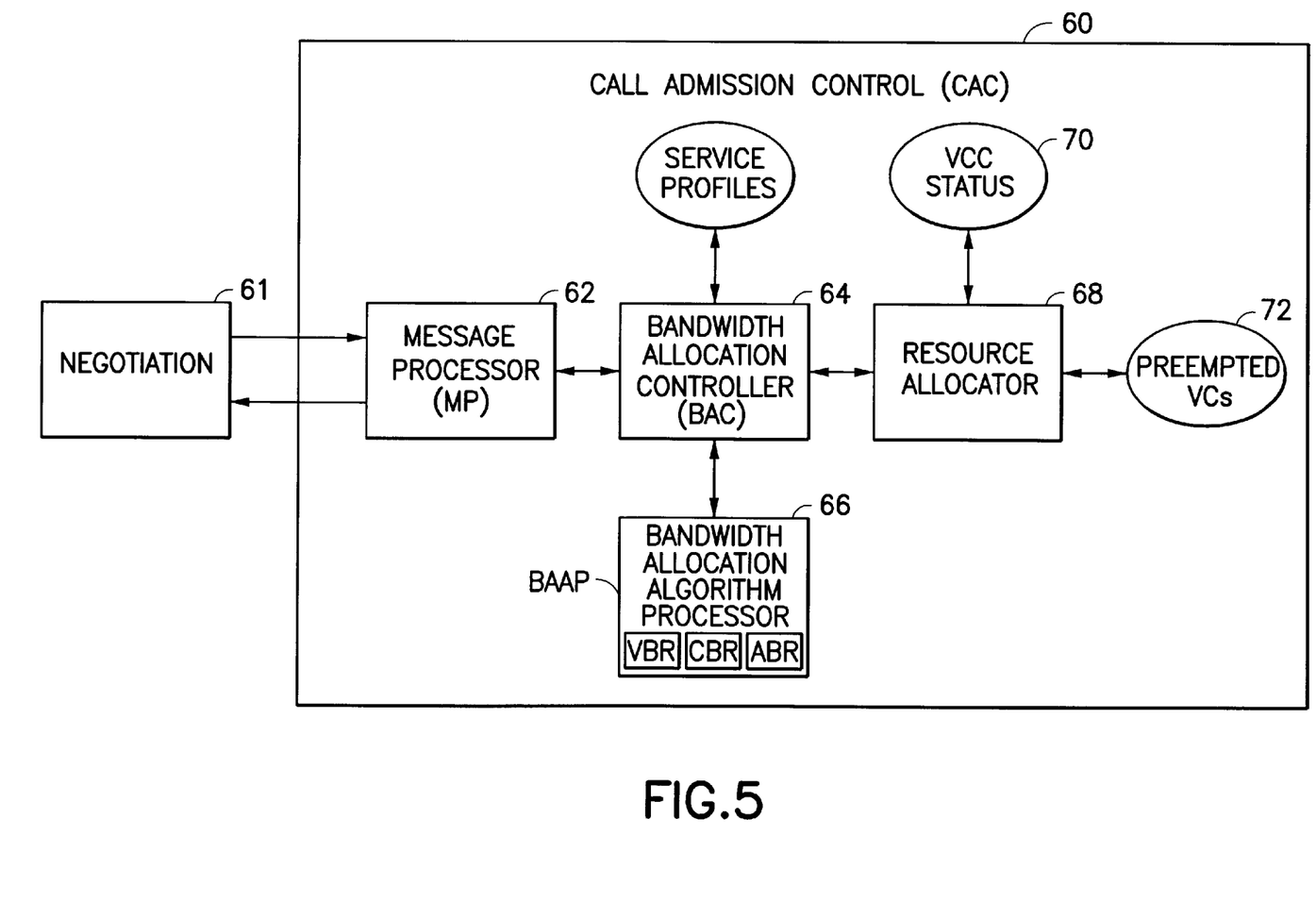
FIG. 5 is a functional block diagram of the precedence and preemption connection admission control system according to the invention.

Referring now to FIG. 5 and according to the invention, a precedence/preemption connection admission control system (P/P CAC) 60 is provided for processing the precedence level of a requested VCC and for preempting one or more active VCCs when a VCC request having a relatively higher precedence level is received at an ATM switch. The P/P CAC 60 includes four components: a message processor 62, a bandwidth allocation controller 64, a CAC algorithm processor 66, and a resource allocator 68. The message processor (MP) 62 receives Q.2931 protocol signals and parses received SETUP messages for requested QoS parameters, receives RELEASE messages when VCCs on the switch are terminated, and further initiates RELEASE messages for rejected VCC requests and preempted VCCs. The message processor negotiates with a VCC requester 61. The bandwidth allocation controller (BAC) 64 maintains the bandwidth assigned to each precedence level, receives VCC requests, forwards the required parameters to the bandwidth allocation algorithm processor (BAAP) 66, requests preemption and bandwidth reallocation to the resource allocator, and invokes a network initiated RELEASE message to a preempted user. The BAAP 66 selects the appropriate bandwidth allocation algorithm from among those available in its memory and runs the algorithm to make a VCC accept or VCC reject decision. The P/P CAC 60 operates with any bandwidth allocation algorithm(s) supplied by the network provider. The resource allocator (RA) 68 contains a first database 70 which lists all active virtual circuit connections (active VCC) and, according to a preferred embodiment of the invention, includes a second database 72 which lists all preempted virtual circuits connections (preempted VCC). The first and second databases 70, 72 may be provided in a single memory means or in two separate memory means.

Figure 6:
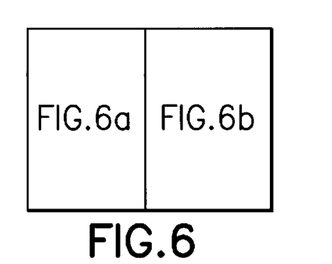
FIG. 6 (represented as FIGS. 6A and 6B, (on two separate sheets) is a flow diagram of a precedence/preemption connection admission control system having a preempted VCC database according to the invention according to a first embodiment of the invention.
Figure 6A:
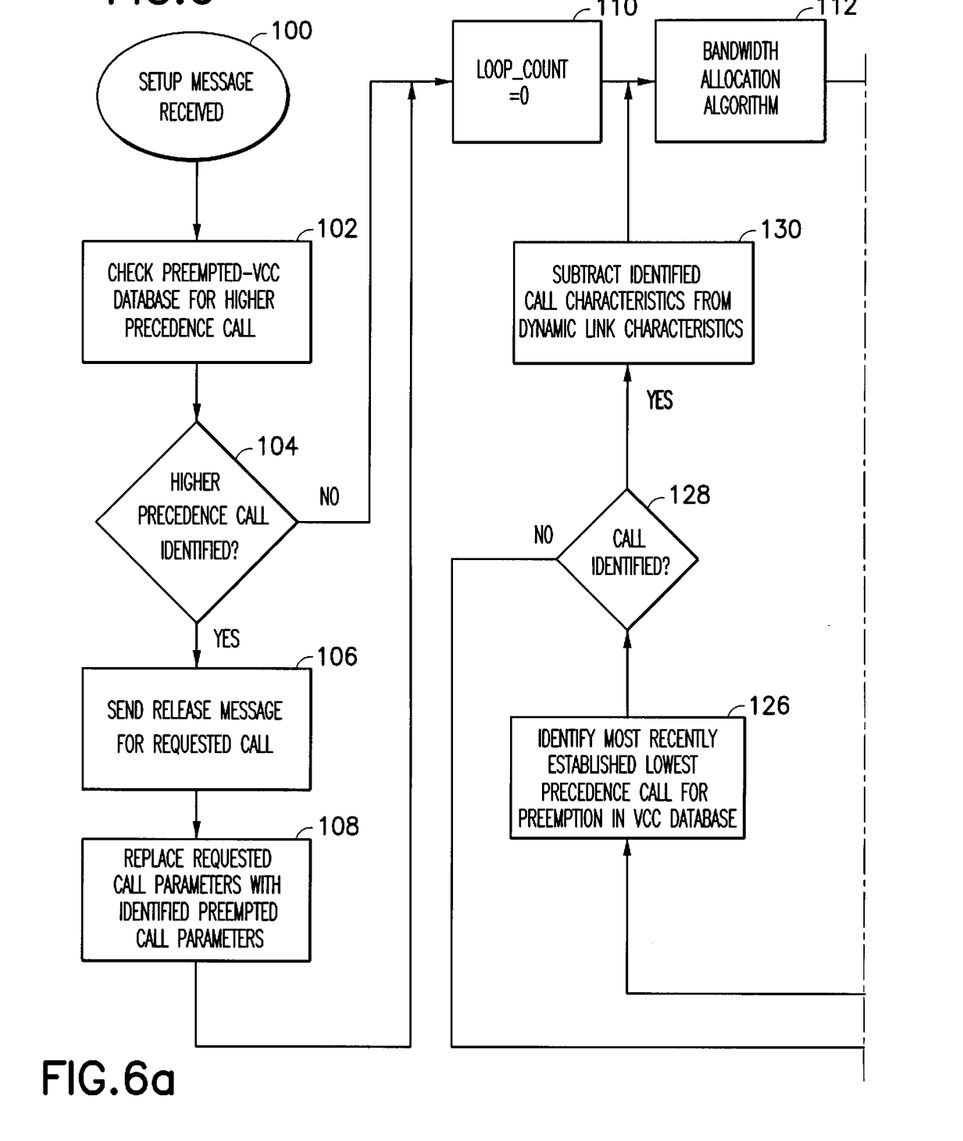
Figure 6B:
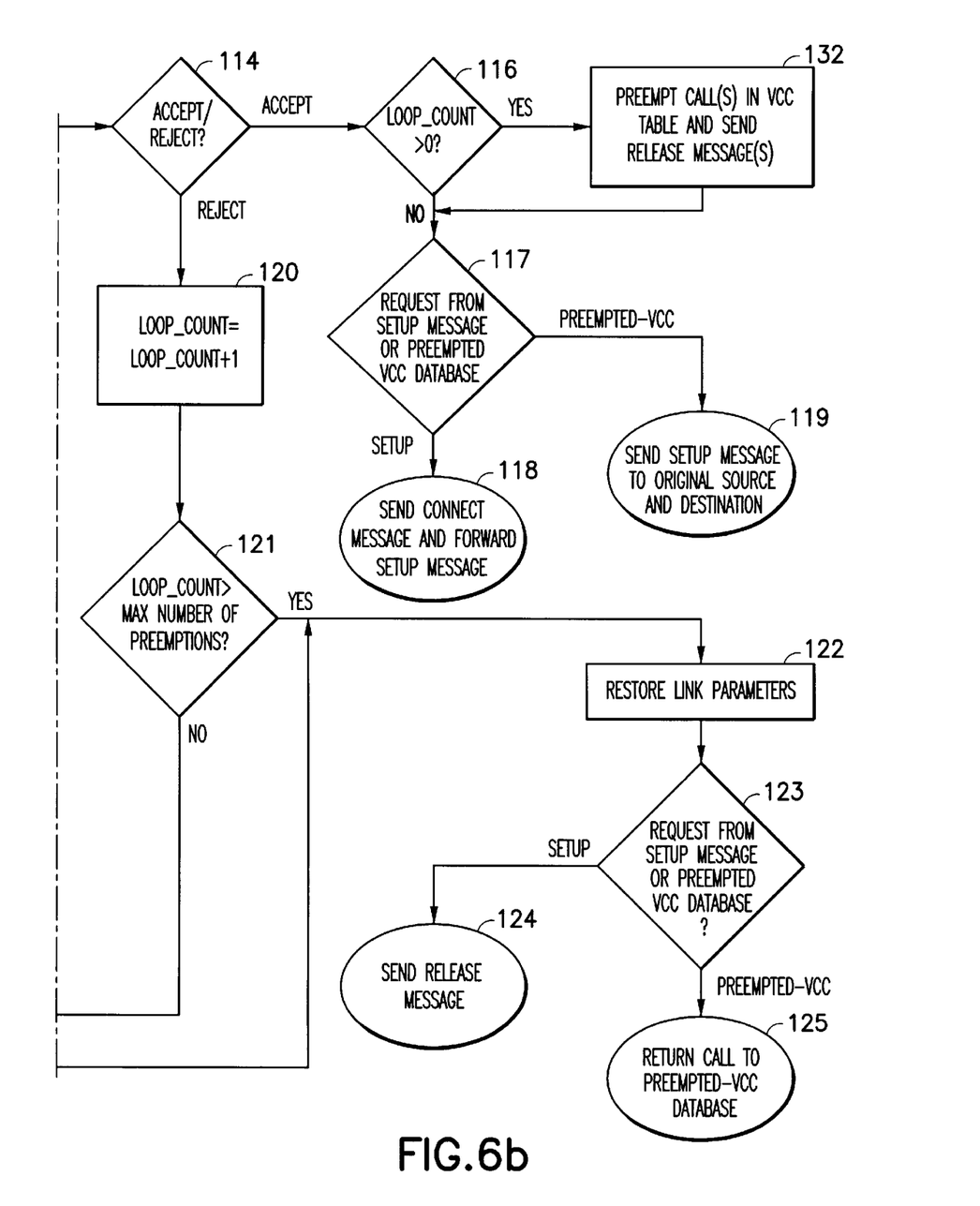

Referring to FIGS. 5 and 6, and according to a first embodiment of the invention, a precedence and preemption connection admission control (P/P CAC) algorithm is provided for processing incoming VCC requests. In particular, the first embodiment is designed for activation upon receipt at the message processor of a SETUP message. First, the message processor 62 receives at 100 a SETUP message for a requested VCC from the requester 61. The message processor 62 analyzes the SETUP message, and determines the parameters of the VCC, including the precedence level of the VCC. The message processor sends the precedence level to the resource allocator 68, where the preempted VCC database 72 is examined at 102 for higher precedence VCCs that were previously preempted.

If parameters for a higher precedence level VCC are identified at 104 in the preempted VCC database 72, a RELEASE message is sent at 106 from the message processor 62 back to the VCC requester, and the requested VCC parameters are replaced at 108 with the parameters of the higher precedence level VCC in the preempted VCC database 72 to be considered later for re-admission. It will be appreciated that, under this first embodiment, consideration for re-admitting a previously preempted VCC occurs on the arrival of a new VCC request. Therefore, the interval for considering a preempted VCC for re-admission is non-deterministic. However, VCC requests have been shown to arrive with a Poisson distribution. As a result, preempted VCCs will also be reconsidered for admission according to a Poisson distribution.

If a higher precedence VCC is not identified at 104 in the preempted VCC database 72, or after requested VCC parameters are replaced at 108 with the parameters of the higher precedence level VCC in the preempted VCC database 72, an updatable counter is set at 110 to zero. The counter represents the number of VCCs which will be preempted if the current VCC request is accepted. The bandwidth allocation controller 64 next activates the BAAP 66 to perform at 112 a bandwidth allocation algorithm. If the first time through the P/P CAC algorithm (i.e., the counter at 116 remains set to zero) the bandwidth allocation algorithm designates the call for acceptance at 114 without preempting an existing VCC, the VCC is accepted, the active VCC database 70 is updated with the new call parameters and a determination is made at 117 as to whether the VCC request came from a SETUP message or from the preempted VCC database. If the request came from a SETUP message, a CONNECT message is returned to the requester and a SETUP message is forwarded to the next switch at 118. If the request came from the preempted VCC database, the network manager sends a SETUP message at 119 to both the original source and destination.

If the bandwidth allocation algorithm rejects at 114 the call request, the counter is incremented at 120 by one. The counter is then compared at 122 to a predetermined (set by the network manager) maximum number of VCC preemptions. If the counter exceeds at 122 the maximum number of VCC preemptions, link parameters are restored at 122. Then, if VCC request is, at 123, for the VCC requested by the SETUP message (at 100), a RELEASE message is returned at 124 to the requester 61. Otherwise, the request is from the preempted VCC database, and the parameters for the VCC are returned at 125 to the preempted VCC database. If the counter does not exceed the maximum number of preemptions at 122, then a search is made at 126 in the active VCC database 70 for the lowest precedence VCC, and in the case of a tie, the VCC being most recently established. If no such call can be identified at 128 in the active VCC database, i.e., there are no active calls having a lower precedence than the requested call, then either a RELEASE message is returned at 124 (if the call request originated from a SETUP message) or the call parameters are returned at 125 to the preempted VCC database (if the call request originated from the preempted VCC database). If a call having lower precedence can be identified at 128, then the characteristics of the identified VCC are "subtracted" (removed) at 130 from the dynamic link parameters, and the P/P CAC algorithm repeats steps 112 onward. That is, the P/P CAC algorithm will continue to cycle through steps 112 through 130 in an attempt to identify link resources to be freed from lower precedence VCCs either until sufficient resources are available from active lower precedence VCCs or until the maximum number of VCCs permitted to be preempted has been exceeded. It is noted that each time through, the bandwidth allocation algorithm is conducted minus an additional VCC identified for preemption.

If during the above-discussed cycling, the bandwidth allocation algorithm accepts at 114 a VCC request prior to the counter exceeding the maximum number of preempted VCCs, then the VCC or VCCs identified at 128 for preemption are removed at 132 from the active VCC database 72 and placed into the preempted VCC database 70, and one or more RELEASE messages are sent at 132 to the VCC(s) identified. If the VCC request originated from a SETUP message, a VCC CONNECT message is provided to the requestor at 118 and a SETUP message is also forwarded at 118 to the next switch or node. On the other hand, if the VCC request originated from the preempted VCC database, a SETUP message is sent at 119 by the network to the original source (original requester) and destination to reestablish the connection.

As the VCCs identified for preemption are stored in the preempted VCC database 70, the preempted VCCs will be considered at 102 for re-admission upon receipt of the next SETUP message for a VCC at the switch or node.

It will be appreciated that the P/P CAC algorithm considers user precedence levels, effective bandwidth, and requested service parameters for the VCC accept/reject decision. Higher precedence VCCs are permitted to preempt up to a predetermined number of lower precedence VCCs when resources are immediately unavailable for the higher precedence VCC, and in accord with the preferred embodiment of the invention, VCCs set for preemption are selected by a last in, first out rule. It will be appreciated that the process time for the algorithm is deterministic and any bandwidth allocation algorithm may be used with the P/P CAC.

It will be appreciated that it is not practical or even preferable to permanently store calls preempted in the preempted VCC database. Preempted calls will become "stale" after a certain period of time, i.e., the disconnected parties will no longer desire re-connection. Therefore, it is preferable that preempted calls be stored for only a certain period of time, e.g., one hour. Furthermore, while preferred, it is not required that the P/P CAC store preempted VCCs in a preempted VCC database. A modified and simpler algorithm may be provided omitting steps 102 through 108; i.e., after a SETUP message is received at 100, the counter is set at 110 to zero, and the algorithm continues forward therefrom. The algorithm is simpler and quicker to implement, and requires fewer resources at a switch or node, e.g., no memory for a preempted VCC database is required. However, omitting the storage of preempted VCCs in a preempted VCC database prevents the possibility of having the network reestablish a preempted VCC.

Figure 7:
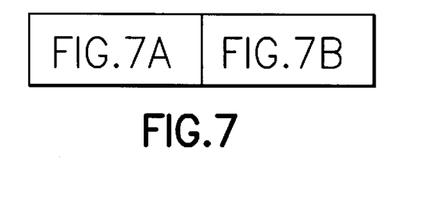
FIG. 7 (represented as FIGS. 7A and 7B, (on two separate sheets) is a flow diagram of a precedence/preemption connection admission control system having delayed preemption according to a second embodiment of the invention.
Figure 7A:
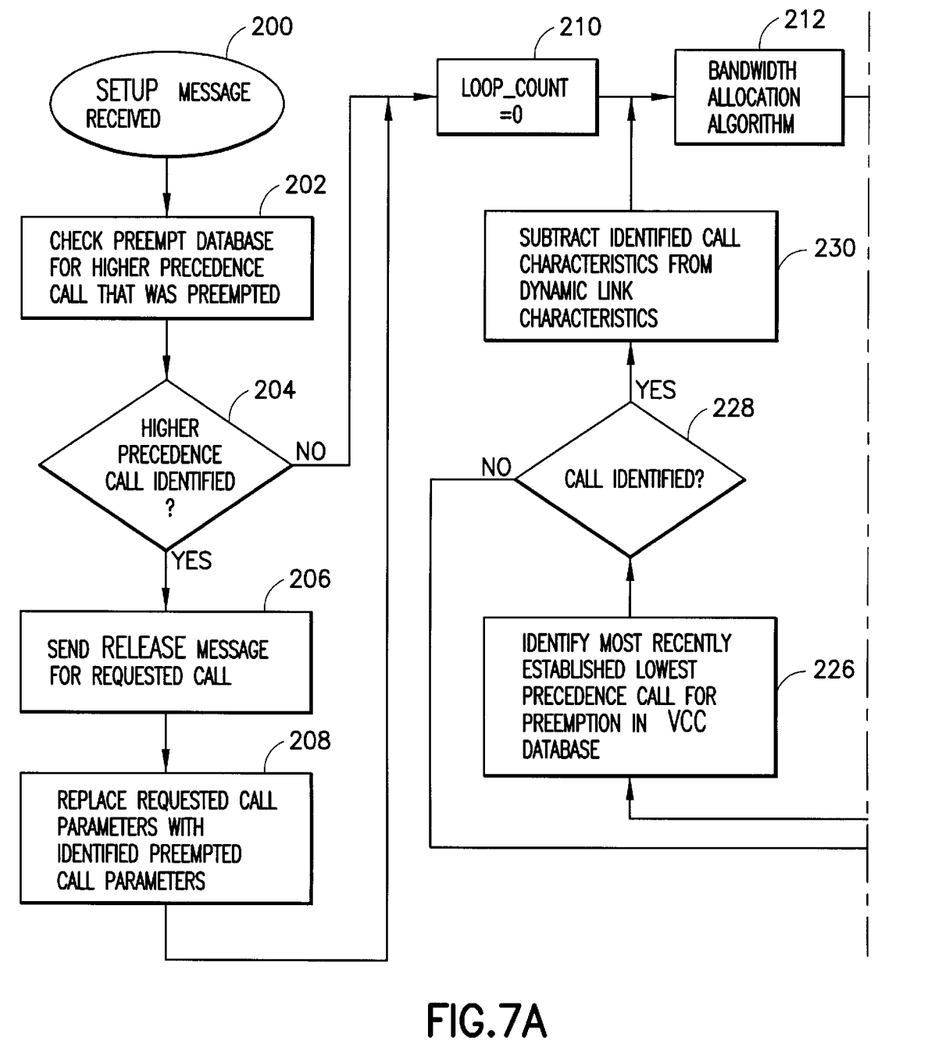
Figure 7B:
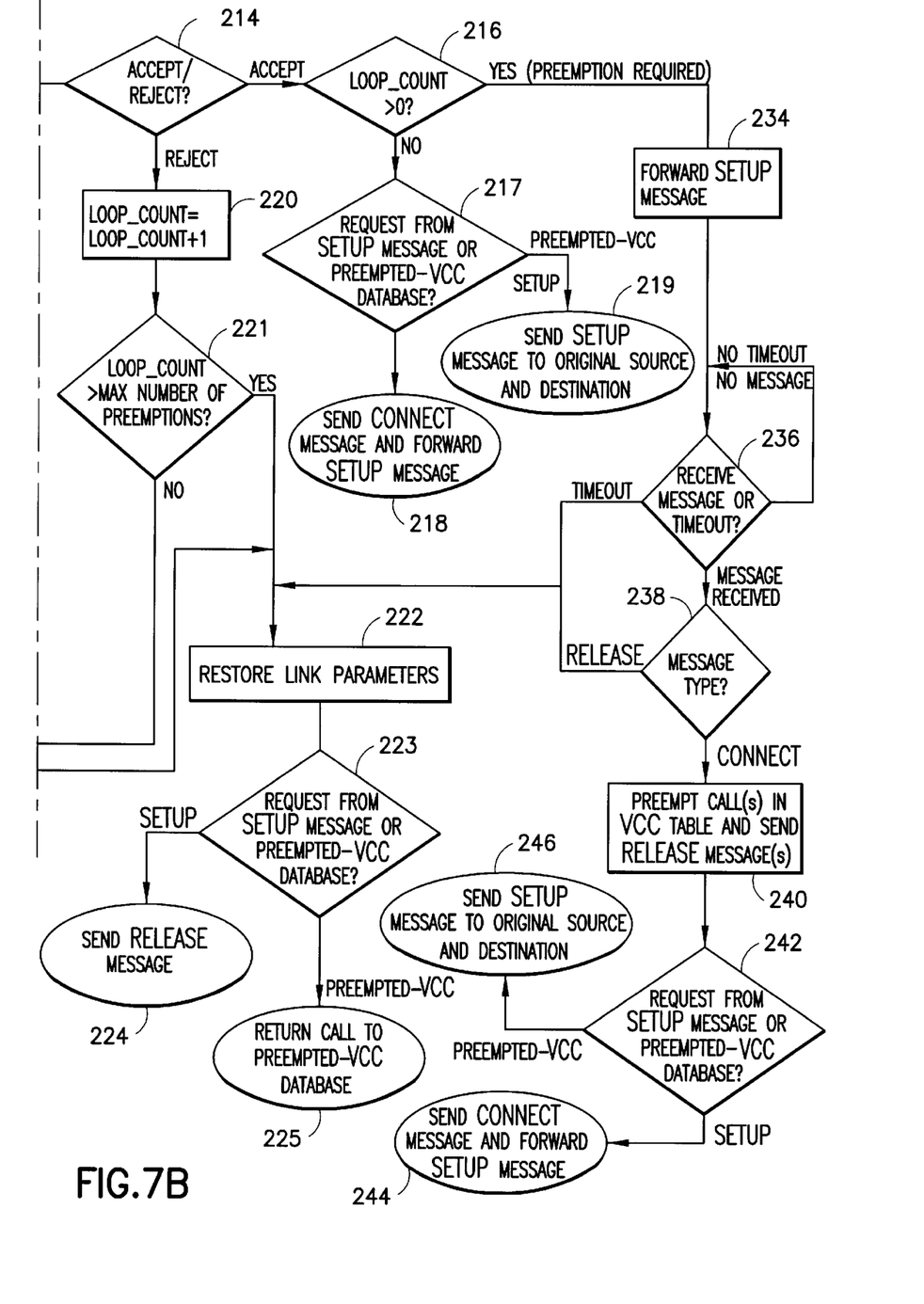

Turning to FIG. 7, a second embodiment of a P/P CAC is provided. The P/P CAC of FIG. 7 is substantially similar to the first embodiment (with like systems and steps having similar numbers incremented by 100), but further includes an option to delay preemption of VCCs until the requested VCC has been accepted at its destination. Upon receiving a SETUP message at 200, the P/P CAC checks at 202 the preempted VCC database for a previously preempted higher precedence VCC. If a higher precedence VCC is identified at 204, the requested VCC is provided at 206 with a RELEASE message and the identified VCC is replaced at 208 with the requested VCC. Depending on whether a higher precedence VCC is identified, requested VCC parameters are either the originally requested VCC or the replaced VCC parameters. The counter is set at 210 to zero and a bandwidth allocation algorithm is run at 212 a first time. If the bandwidth allocation algorithm determines at 214 that sufficient resources are available to accept the requested VCC, a determination is then made at 217 as to whether the call request originated from a SETUP message or from the preempted VCC database. If the request originated from a SETUP message, a CONNECT message is sent at 218 and the SETUP message is forwarded at 218 to the next switch or node. If the request originated from the preempted VCC database, a SETUP message is sent at 219 to the original source and destination. In either case, no VCCs are preempted. If the bandwidth allocation algorithm rejects at 214 the VCC, the counter is incremented at 220. While the counter at 221 does not exceed a maximum number of VCCs for preemption, the most recent lower precedence calls, if available, are identified at 226, 228 for preemption, and the parameters of the identified VCCs are subtracted at 230 from the occupied link resources. If the counter has exceeded at 221 the maximum number of VCCs for preemption and still the required resources are not available, the link parameters are restored at 222 and either a RELEASE message is returned at 224 (if the call request originated from a SETUP message) or the call parameters are returned at 225 to the preempted VCC database (if the call request originated from the preempted VCC database). Likewise, according to the above criteria at 223, if a VCC having a lower precedence cannot be identified at 228, the link parameters are restored at 222, and either a RELEASE message is sent at 224, or the parameters for the preempted VCC are returned to the preempted VCC database at 225.

If the bandwidth allocation algorithm is able to accept a requested VCC at 214 such that preemption of active VCCs is required (i.e., the counter has been incremented at least once to a value greater than zero), a SETUP message is forwarded at 234 to the downstream switch and the P/P CAC awaits at 236 a message from the downstream switch. If no message is returned at 236 before a "timeout", or if a RELEASE message is returned at 238 from the downstream switch or node prior to the "timeout", the link parameters are restored at 222 and either a RELEASE message is returned at 224, or the VCC parameters are returned at 225 to the preempted VCC database, depending on whether, at 223, the VCC request originated from a SETUP message or from the preempted VCC database. On the other hand, if a CONNECT message is received at 238 prior to the "timeout" from the downstream switch or node, the one or more VCCs identified for preemption are preempted in the active VCC database and transferred to the preempted VCC database at 240, and RELEASE messages are sent, also at 240, for the preempted calls. A CONNECT message is then sent at 244 for the VCC if the request originated from a SETUP message, a determination of which is made at 242. If the request originated from the preempted VCC database, also determined at 242, a SETUP message is sent at 246 to the original source and destination.

In the above P/P CAC, the CONNECT message is not transmitted once the VCC is accepted on the basis of preemption. Rather, the switch holds the CONNECT message until it receives a CONNECT from the downstream switch. Likewise, the RELEASE message for the preempted VCC(s) is held until the CONNECT is received. As a result, a requested VCC is prevented from preempting active VCCs if the requested VCC is rejected at another switch in the network.

As stated above with respect to the first embodiment, it is not required that the P/P CAC store preempted VCCs in a preempted VCC database. Omitting the storage of preempted VCC in a preempted VCC database will, as stated above, prevent the possibility of having the network reestablish a preempted call. However, the algorithm is simpler and quicker to implement, and requires fewer resources.

Figure 8:
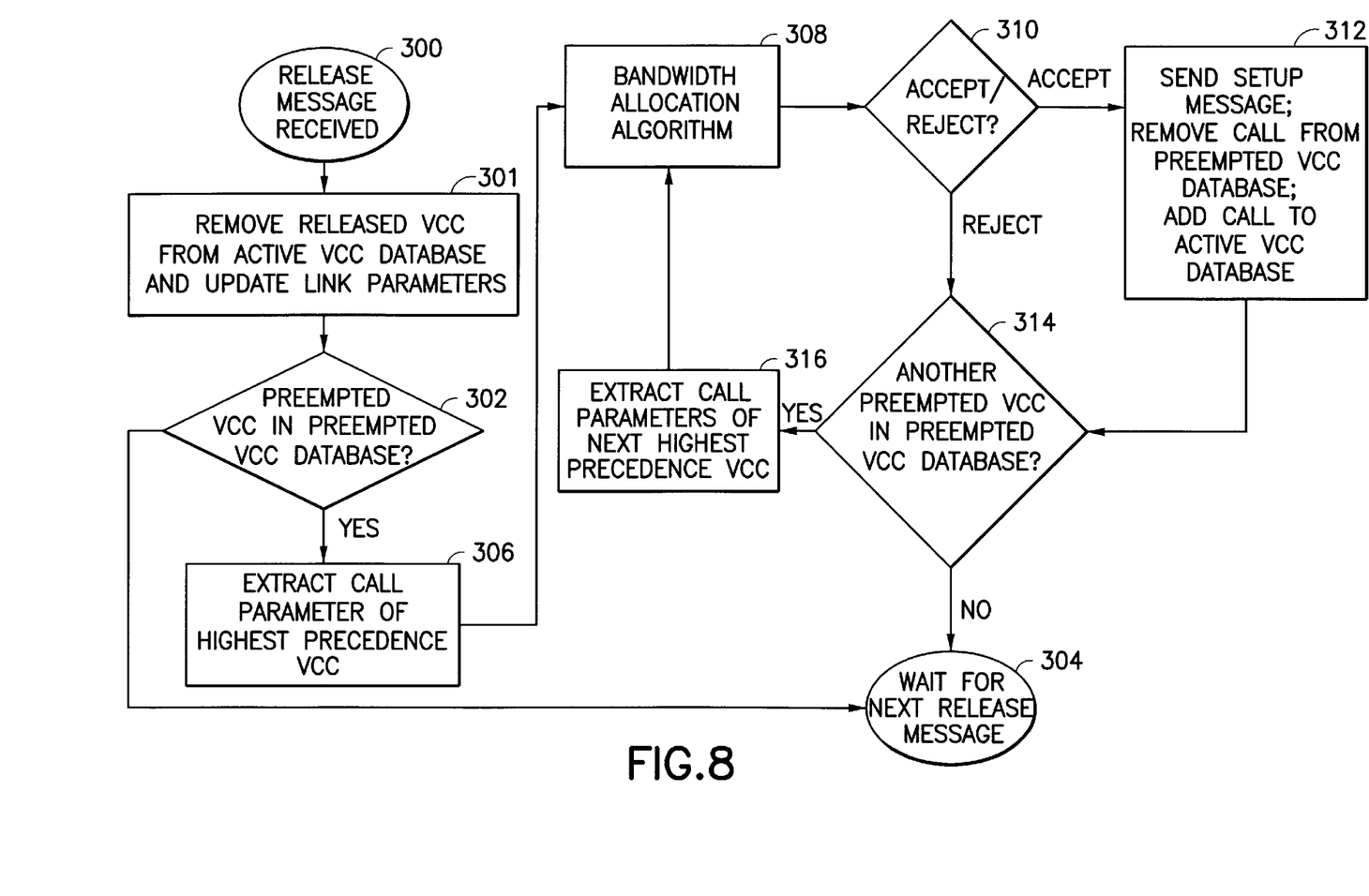
FIG. 8 is a flow diagram of a precedence/preemption admission control system which attempts to reestablish preempted calls when resources are available according to a third embodiment of the invention.

Turning to FIG. 8, a third embodiment of a precedence/preemption connection admission control system is provided. Unlike the first and second embodiments, which attempt to reestablish preempted VCCs upon receipt of a VCC SETUP request, the third embodiment uses an algorithm which attempts to reestablish preempted VCCs whenever a VCC is released from the switch; i.e., activation of the algorithm occurs upon receipt of a RELEASE message at the message processor. It will be appreciated from the outset that the third embodiment may be used in conjunction with either of the first two embodiments to provide an optimally functioning P/P CAC.

When the message processor receives at 300 a RELEASE message, the released VCC is removed from the active VCC database and the dynamic link parameters of resources utilized at the switch are updated at 301. A search is then made at 302 of the preempted VCC database for preempted VCCs. If a preempted VCC is not located in the preempted VCC database, the algorithm terminates at 304, awaiting the next RELEASE message. If a preempted VCC is located at 302 in the preempted VCC database, the preempted VCC having the highest precedence, and, in the case of a tie, which has been in the preempted VCC database the shortest time, has its QoS parameters provided at 306 to the bandwidth allocation algorithm 308. The bandwidth allocation algorithm determines at 308 whether resources are available on the link for the previously preempted VCC and either accepts or rejects at 310 the VCC based upon the available resources. If the necessary resources are available at 310, the VCC is accepted at 312 for reestablishment, a SETUP message initiated by the network is sent to the original source and destination, and the VCC is removed from the preempted VCC database and added to the active VCC database. Another search is then made at 314 for other preempted VCCs in the preempted VCC database. If other preempted VCCs are located, the VCC highest in precedence, and, in the case of a tie, having been in the preempted VCC shortest is chosen at 316 and sent to the bandwidth allocation algorithm 308 and continue to be processed according to P/P CAC algorithm (310–316). If a VCC request is rejected at 310 by the bandwidth allocation algorithm, another search is made at 314 to determine whether other preempted VCCs are in the preempted VCC database. Preferably, the entire preempted VCC database will thereby be searched, in order of precedence, to determine whether any of the preempted VCC may be reestablished. Once the entire preempted VCC database is searched, the algorithm terminates at 304, to be initiated again once the message processor receives the next RELEASE message. Alternatively, only a portion of the preempted VCC database may be searched. For example, the P/P CAC may be set such that only preempted VCCs within two precedence levels of the highest precedence VCC in the preempted VCC database are searched.

When the P/P CAC of the third embodiment is used in conjunction with the P/P CAC of the first and second embodiments, it is preferable that the P/P CAC of the third embodiment be automatically interrupted when a SETUP message is received at the message processor. This is because SETUP messages are preferably given priority over preempted VCCs, at least until their respective precedence levels are compared.

Using the algorithm of the third embodiment in conjunction with the algorithm of either the first or second embodiments, a P/P CAC system is provided wherein requested VCCs are given access to link resources based upon the precedence level of the requested VCCs relative to the precedence level of active VCCs currently traversing an ATM switch. Lower precedence level VCC are preempted in favor of higher precedence VCCs. VCCs which have been preempted are attempted to be reestablished when bandwidth resources become available (i.e., upon receipt of RELEASE messages at the message processor) and prior to processing a requested VCC having a relatively lower precedence (i.e., upon receipt of a SETUP message at the message processor).

There have been described and illustrated herein several embodiments of a precedence and preemption connection admission control. While particular embodiments of the invention have been described, it is not intended that the invention be limited thereto, as it is intended that the invention be as broad in scope as the art will allow and that the specification be read likewise. Thus, while an information element capable of containing any of 256 precedence levels has been disclosed, it will be appreciated that 256 levels need not be available; i.e., fewer than all 256 levels may be assignable. For example, only five distinct precedence levels may be desired. Moreover, additional octets of the informational element may be utilized to provide a greater number of precedence levels. Also, the preempted VCC database need not store all preempted VCCs, but may store only a certain number of preempted VCCs. Likewise, the active VCC database need not store all active VCCs. However, it preferable that at least the VCCs having a precedence level other than the highest precedence level be stored in the active VCC database. It will also be appreciated that the third embodiment of the precedence and preemption connection admission control system may be modified to permit preemption of active calls by the previously preempted calls seeking reestablishing, as a similar process is described with respect to the first and second embodiments. In addition, further modifications to the precedence and preemption connection admission control can be made with reference to "An Algorithm for Precedence and Preemption in Asynchronous Transfer Mode (ATM) Call Admission Control" by Poretsky, which is attached hereto as Appendix 1 and which is hereby incorporated by reference herein in its entirety. It will therefore be appreciated by those skilled in the art that yet other modifications could be made to the provided invention without deviating from its spirit and scope as so claimed.

What is claimed is:

1. A method of preempting active calls traversing an ATM switch or ATM node in favor of an inactive call during connection admission control, comprising:

a) for each active call, storing a first indication of a precedence level assigned to that active call and carried in a call message used to establish that active call such that a plurality of first indications are stored;

b) determining a second indication of a precedence level assigned to the inactive call and carried in a call message used in attempting to establish the inactive call;

c) comparing said second indication with at least one of said plurality of first indications; and d) when said comparing indicates that said second indication indicates a relatively higher precedence than at least one of said plurality of first indications, designating said inactive call for acceptance, and designating at least one of said active calls having a first indication of relatively lower precedence than said second indication for preemption.

2. A method according to claim 1, further comprising:

e) accepting said inactive call designated for acceptance and preempting said active call designated for preemption when preempting provides sufficient resources at the ATM switch or ATM node for accepting said inactive call.

3. A method according to claim 2, further comprising:

f) using a bandwidth allocation algorithm to determine whether sufficient resources are available, said bandwidth allocation algorithm being performed on said active calls plus the inactive call designated for acceptance minus said active call designated for preemption.

4. A method according to claim 2, further comprising:

f) attempting reestablishment of said preempted call whenever resources are freed from the switch ATM or ATM node.

5. A method according to claim 4, wherein:

an inactive call designated for acceptance does not preempt an active call unless a destination for said inactive call accepts said call designated for acceptance.

6. A method according to claim 4, further comprising:

e) postponing reestablishment of said preempted call unless a destination accepts said preempted call prior to a timeout.

7. A method according to claim 2, further comprising:

f) attempting reestablishment of said preempted call whenever an inactive call seeking acceptance is received at the ATM switch or ATM node.

8. A method according to claim 7, wherein:

an inactive call designated for acceptance does not preempt an active call unless a destination for said inactive call accepts said call designated for acceptance.

9. A method according to claim 7, further comprising:

e) postponing reestablishment of said preempted call unless a destination accepts said preempted call prior to a timeout.

10. A method according to claim 1, wherein:

said inactive call is a call requesting acceptance to traverse the ATM switch or ATM node.

11. A method according to claim 1, further comprising:

e) providing said preempted calls to a preempted call database.

12. A method according to claim 11, wherein:

said inactive call is a previously preempted call whose second indication of precedence level is located in said preempted call database.

13. A method according to claim 11, further comprising:

f) attempting to reestablish one of said preempted calls and rejecting an inactive call seeking acceptance when said one of said preempted calls in said preempted call database has a relatively higher precedence than said inactive call seeking acceptance.

14. A method according to claim 1, wherein:

said inactive call designated for acceptance is refused acceptance if accepting said inactive call designated for acceptance requires preempting more than a predetermined number of active calls.

15. A precedence and preemption connection admission control system for processing a call request in light of available resources at an ATM switch or ATM node, the call request having an information element having at least one bit representing a precedence level, said system comprising:

a) a memory means including a first database means for storing information on active calls; and b) a processor means coupled to said memory means, said processor means i) for receiving the call request and reading parameters of the call request including said at least one bit, ii) for determining whether sufficient resources are present at the ATM switch or ATM node for accepting the call request based on said information on active calls and based upon said parameters of said call request, iii) for preempting at least one active call having a relatively lower precedence level than the precedence level of the call request in order to accept the call request, and iv) for updating said information in said first database to add information on the call request and to delete information on said at least one active call preempted.

16. A system according to claim 15, wherein:

said memory means includes a second database means for storing second information on preempted calls, and said processor means includes means for updating said second database to add information on said at least one active call preempted.

17. A system according to claim 16, further comprising:

c) means for reestablishing said at least one active call preempted using information from said second database.

18. A system according to claim 15, wherein:

said processor means is adapted to receive an ATM call request, and said precedence level is provided in an information element of an ATM SETUP message.

* * * * *